US012801119B2

(12) United States Patent
Yin

(10) Patent No.: US 12,801,119 B2
(45) Date of Patent: Nov. 17, 2026

(54) AMPLIFIER SELECTION APPARATUS AND COMPUTER-READABLE STORAGE MEDIUM

(71) Applicant: FANUC CORPORATION, Yamanashi (JP)

(72) Inventor: Yuandong Yin, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 306 days.

(21) Appl. No.: 18/580,613

(22) PCT Filed: Jul. 28, 2021

(86) PCT No.: PCT/JP2021/027902
§ 371 (c)(1),
(2) Date: Jan. 19, 2024

(87) PCT Pub. No.: WO2023/007615
PCT Pub. Date: Feb. 2, 2023

(65) Prior Publication Data
US 2024/0338010 A1 Oct. 10, 2024

(51) Int. Cl.
*G05B 15/02* (2006.01)
*G05B 19/042* (2006.01)
(Continued)

(52) U.S. Cl.
CPC ..... *G05B 19/4141* (2013.01); *G05B 19/0423* (2013.01); *G05B 19/106* (2013.01)

(58) Field of Classification Search
CPC ............ G05B 19/4141; G05B 19/0423; G05B 19/106; H02P 5/00; G06F 3/04847
See application file for complete search history.

(56) References Cited

U.S. PATENT DOCUMENTS 6,546,127 B1 * 4/2003 Seong ................ G05B 19/4069 318/599
6,826,434 B1 * 11/2004 Chang ................ G05B 19/4145 318/632
(Continued)

FOREIGN PATENT DOCUMENTS

CN 103157866 A * 6/2013
CN 104570957 A * 4/2015 ......... G05B 19/4142
(Continued)

OTHER PUBLICATIONS

C. Krajewski, "The HMK guide to Sizing of Servo Motors and Amplifier", Training Manual, Aug. 31, 2002, pp. 1-23, Edition 2, 23pp.

*Primary Examiner* — Yongjia Pan
(74) *Attorney, Agent, or Firm* — HAUPTMAN HAM, LLP

(57) ABSTRACT

The amplifier selection apparatus for selecting an amplifier for a motor of an industrial machine is configured to acquire a program for an industrial machine, analyze the acquired program, acquire a drive mechanism and machine specifications of a motor, select a motor of the industrial machine, select an amplifier that fits the motor of the industrial machine, calculate an hourly output of the motor when the motor is controlled according to a command of the program, determine a maximum value of the hourly output of the motor, and select a common power source for supplying electric power to the amplifier on the basis of the maximum value.

6 Claims, 12 Drawing Sheets

(51) Int. Cl.
*G05B 19/10* (2006.01)
*G05B 19/414* (2006.01)

(56) References Cited

U.S. PATENT DOCUMENTS

| | | | | |
|---|---|---|---|---|
| 10,699,743 | B2 * | 6/2020 | Tanouchi | G11B 19/247 |
| 10,832,295 | B2 * | 11/2020 | Chen | G06Q 50/00 |
| 10,838,380 | B2 * | 11/2020 | Chou | G05B 17/02 |
| 10,868,481 | B2 * | 12/2020 | Tanouchi | H02P 8/40 |
| 11,353,846 | B2 * | 6/2022 | Tanouchi | G05B 19/4141 |
| 12,126,288 | B2 * | 10/2024 | Sakai | H02K 11/33 |
| 12,282,942 | B2 * | 4/2025 | Sakai | G06Q 30/0283 |
| 2011/0035044 | A1 * | 2/2011 | Takahashi | G05B 19/4069<br>700/178 |
| 2013/0173045 | A1 * | 7/2013 | Kawana | G05B 19/404<br>700/186 |
| 2017/0139391 | A1 | 5/2017 | Yamamoto | |
| 2017/0141581 | A1 * | 5/2017 | Yamamoto | G06Q 10/06 |
| 2017/0371316 | A1 * | 12/2017 | Kimura | G05B 19/4097 |
| 2018/0348719 | A1 | 12/2018 | Chou et al. | |
| 2019/0088282 | A1 * | 3/2019 | Tanouchi | G06F 16/252 |
| 2019/0088283 | A1 | 3/2019 | Tanouchi | |
| 2020/0096973 | A1 | 3/2020 | Tanouchi et al. | |

FOREIGN PATENT DOCUMENTS

| | | | | | |
|---|---|---|---|---|---|
| JP | 2010187464 | A | * | 8/2010 | |
| JP | 2015-192475 | A | | 11/2015 | |
| JP | 2017-093209 | A | | 5/2017 | |
| JP | 2017220991 | A | * | 12/2017 | |
| JP | 6381249 | B2 | * | 8/2018 | |
| JP | 2018-207692 | A | | 12/2018 | |
| JP | 2019-057962 | A | | 4/2019 | |
| JP | 2019058046 | A | * | 4/2019 | G06Q 50/00 |
| JP | 2020-054104 | A | | 4/2020 | |

* cited by examiner

FIG. 2

MACHINE SPECIFICATIONS (BALL SCREW)

| | UNIT | SETTING VALUE |
|---|---|---|
| MECHANICAL EFFICIENCY | – | 0.9 |
| WEIGHT OF MOVING OBJECT | kg | 25 |
| COUNTER BALANCE | N | 0 |
| DIAMETER OF BALL SCREW | mm | 32 |
| BALL SCREW LEAD | mm/rev | 16 |
| LENGTH OF BALL SCREW | mm | 500 |
| REDUCTION RATIO | – | 1 / 1 |

FIG. 3

ACCELERATION AND DECELERATION CONTROL SETTINGS

| | |
|---|---|
| ACCELERATION AND DECELERATION TYPE | BELL TYPE/LINEAR TYPE/EXPONENTIAL TYPE |

| | UNIT | SETTING VALUE |
|---|---|---|
| ACCELERATION AND DECELERATION TIME CONSTANT T1 AT TIME OF RAPID TRAVERSE | ms | 96 |
| ACCELERATION AND DECELERATION TIME CONSTANT T2 AT TIME OF RAPID TRAVERSE | ms | 32 |
| ACCELERATION AND DECELERATION TIME CONSTANT $T_c$ AT TIME OF CUTTING FEED | ms | 96 |
| POSITION LOOP GAIN | 1/s | 30 |
| RAPID TRAVERSE RATE | mm/min | 40000 |
| POSITIONING DISTANCE | mm | 180 |

FIG. 4

ANALYSIS RESULTS OF MACHINING PROGRAM

| LINE | MODE | TIME [s] | POSITION (ABS) [mm] | SPEED [mm/s] | CUTTING LOAD [N] | CUTTING TIME [s] | VIBRATION FREQUENCY [s] |
|---|---|---|---|---|---|---|---|
| 1 | STOP TIME | 0.5 | 0 | 0 | | | |
| 2 | RAPID TRAVERSE | 0.2 | 100 | 500 | | | |
| 3 | CUTTING FEED | 20.0 | 160 | 3 | 0 | 20.0 | |
| 4 | STOP TIME | 0.1 | 160 | 0 | | | |
| 5 | RAPID TRAVERSE | 0.32 | 0 | 500 | | | |
| ... | ... | ... | ... | ... | ... | ... | ... |
| ... | ... | ... | ... | ... | ... | ... | ... |

FIG. 7

```
G90 G94 ;
G04 X0.5 ;
G00 X100.F30000 ;
G01 X160.F180 ;
G04 X0.1 ;
G00 X0.F30000 ;
        .
        .
        .
```

FIG. 8

SPECIFICATION VALUES OF X-AXIS MOTOR

| SPECIFICATION VALUES | X-AXIS MOTOR |
|---|---|
| MAXIMUM CURRENT | 48Ap |
| CONTINUOUS CURRENT | 12Ap |

SPECIFICATION VALUES OF AMPLIFIER

| SPECIFICATION VALUES | AMPLIFIER 1 | AMPLIFIER 2 |
|---|---|---|
| MAXIMUM CURRENT | 40Ap | 80Ap |
| CONTINUOUS CURRENT | 11.5Ap | 22.5Ap |

FIG. 9

| | |
|---|---|
| AMPLIFIER GROUP NAME | AmpGroup 1 |

| AXIS NAME | MODEL NAME |
|---|---|
| X | MODEL 1 |
| Y | MODEL 2 |
| Z | MODEL 3 |
| SPINDLE | MODEL 3 |

FIG. 10

SELECTION OF COMMON POWER SUPPLY ACCORDING TO PRESENT DISCLOSURE

OUTPUT

| TIME SERIES | X-AXIS | Y-AXIS | Z-AXIS | SPINDLE | TOTAL |
|---|---|---|---|---|---|
| 1min | 8kW | 0kW | 0kW | 6kW | 14kW |
| 2min | 8kW | 6kW | 5kW | 6kW | 25kW |
| ⋮ | 0kW | 5kW | 5kW | 2kW | 12kW |
| 30min | 2kW | 0kW | 2kW | 3kW | 7kW |

MAXIMUM VALUE: 25kW

SPECIFICATION VALUES OF COMMON POWER SUPPLY

| SPECIFICATION VALUES | MAXIMUM OUTPUT |
|---|---|
| COMMON POWER SUPPLY 1 | 27kW |
| COMMON POWER SUPPLY 2 | 40kW |

SELECT COMMON POWER SUPPLY 1

FIG. 11

SELECTION OF COMMON POWER SUPPLY ACCORDING TO RELATED ART

SPECIFICATION VALUES OF OUTPUTS OF MOTORS

| SPECIFICATION VALUES | MAXIMUM OUTPUT |
|---|---|
| X-AXIS MOTOR | 8kW |
| Y-AXIS MOTOR | 8kW |
| Z-AXIS MOTOR | 8kW |
| SPINDLE MOTOR | 6kW |
| TOTAL | 30kW |

TOTAL VALUE: 30kW

SPECIFICATION VALUES OF COMMON POWER SUPPLY

| SPECIFICATION VALUES | MAXIMUM OUTPUT |
|---|---|
| COMMON POWER SUPPLY 1 | 27kW |
| COMMON POWER SUPPLY 2 | 40kW |

COMMON POWER SUPPLY 2

FIG. 13

CALCULATED CURRENT VALUE

| REQUIRED AMOUNT | X-AXIS MOTOR |
| --- | --- |
| MAXIMUM CURRENT | 40Ap |
| CONTINUOUS CURRENT | 9Ap |

SPECIFICATION VALUES OF AMPLIFIER

| SPECIFICATION VALUES | AMPLIFIER 1 | AMPLIFIER 2 |
| --- | --- | --- |
| MAXIMUM CURRENT | 40Ap | 80Ap |
| CONTINUOUS CURRENT | 11.5Ap | 22.5Ap |

AMPLIFIER SELECTION APPARATUS AND COMPUTER-READABLE STORAGE MEDIUM

RELATED APPLICATIONS

The present application is a National Phase of International Application No. PCT/JP2021/027902 filed Jul. 28, 2021.

TECHNICAL FIELD

The present invention relates to an amplifier selection device and a computer-readable storage medium.

BACKGROUND ART

Patent Document 1 discloses a "configuration including: an amplifier group assignment unit that assigns each of a plurality of motors to any one of a plurality of amplifier groups on the basis of an amplifier group number input from an input unit; a total rated output calculation unit that calculates a total value of rated outputs of the motors assigned to the amplifier group for each of the plurality of amplifier groups; a common power supply selection unit that determines whether or not each of a plurality of common power supplies having a predetermined power supply capacity satisfies a condition that the magnitude of the power supply capacity is equal to or greater than the total value of each of the plurality of amplifier groups and selects one or more common power supplies satisfying the condition; and a display control unit that displays the selected one or more common power supplies for each of the plurality of amplifier groups on a display unit so as to be identifiable".

In selection of amplifiers of industrial machines such as machine tools and process injection molding machines, in general, a motor, an amplifier, and a common power supply for amplifiers are sequentially selected on the basis of inputs such as a driving mechanism of the industrial machine, the characteristics of the motor, and an operation pattern.

CITATION LIST

Patent Document

Patent Document 1: JP 2020-54104 A

SUMMARY OF THE INVENTION

Problem to be Solved by the Invention

In the related art, since the specification values of the motor are used to select an amplifier and a common power supply, an amplifier and a common power supply with excessive capacity may be selected. In the selection of the amplifier and the common power supply, it is desirable to select models with just the right amount of capacity. In addition, in many cases, in operation settings at the time of selection, all operating conditions are manually input. In particular, in a case in which an operation is complicated, it is also desirable to avoid complexity of the manual input.

In the field of selection of motors, amplifiers, common power supplies, and the like, it is desirable to select appropriate models and to simplify selection settings.

Means for Solving Problem

According to an aspect of the present disclosure, there is provided an amplifier selection device for selecting an amplifier of a motor in an industrial machine. The amplifier selection device includes: a program acquisition unit configured to acquire a program of the industrial machine; a program analysis unit configured to analyze the program; a motor selection unit configured to select a motor of the industrial machine; an amplifier selection unit configured to select an amplifier suitable for the motor of the industrial machine; an output calculation unit configured to calculate an output of the motor for each time when the motor is controlled according to a command of the program; and a common power supply selection unit configured to determine a maximum value of the output of the motor for each time and to select a common power supply for supplying power to the amplifier on the basis of the maximum value.

According to another aspect of the present disclosure, there is provided a storage medium storing computer-readable commands causing one or more processors to: acquire a program of an industrial machine; analyze the program; select a motor of the industrial machine; select an amplifier suitable for the motor of the industrial machine; calculate an output of the motor for each time when the motor is controlled according to a command of the program; and determine a maximum value of the output of the motor for each time and select a common power supply for supplying power to the amplifier on the basis of the maximum value.

Effect of the Invention

According to an aspect of the invention, it is possible to select an appropriate model in the field of the selection of amplifiers. Furthermore, it is also possible to simplify operation settings at the time of selection.

BRIEF DESCRIPTION OF DRAWINGS

FIG. 2 illustrates a machine condition setting screen;

FIG. 3 illustrates an acceleration and deceleration control setting screen;

FIG. 4 is a table illustrating analysis results of a machining program;

FIG. 7 illustrates an example of the machining program;

FIG. 8 is a diagram illustrating specification values of a motor and an amplifier;

FIG. 9 is a diagram illustrating a relationship between an amplifier group and amplifiers;

FIG. 10 is a diagram illustrating a relationship between an output for each time and the selection of a common power supply;

FIG. 11 is a diagram illustrating a common power supply selection method according to the related art;

FIG. 13 is a diagram illustrating calculated current values of a motor and specification values of amplifiers.

MODE(S) FOR CARRYING OUT THE INVENTION

[First Disclosure]

Hereinafter, an amplifier selection device 100 according to a first disclosure will be described.

The amplifier selection device 100 according to the first disclosure is, for example, implemented in an information processing apparatus such as a personal computer (PC). Dedicated software for selecting an amplifier of an industrial machine is installed in the amplifier selection device 100. A user operates the software to select a motor, an amplifier, and a common power supply.

In the first to third disclosures, an example in which a motor, an amplifier, and a common power supply of a machine tool are selected on the basis of a machining program will be described. However, motors, amplifiers, and common power supplies of industrial machines, such as press machines and injection molding machines, other than the machine tools may be selected. Instead of the machining program, an operation program is used to select the motors, amplifiers, and common power supplies of the industrial machines other than the machine tools.

Figure 1:
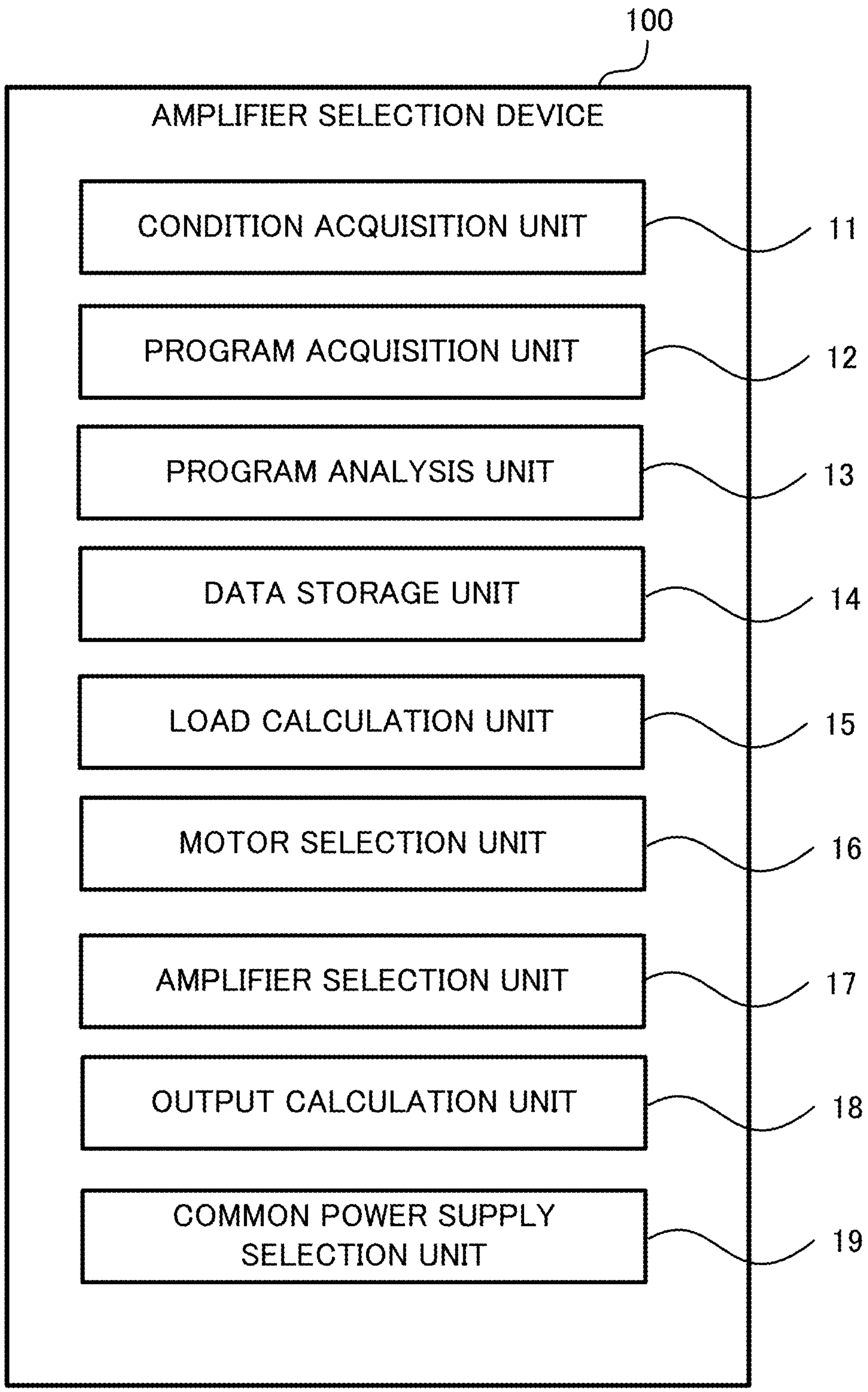
FIG. 1 is a block diagram illustrating an amplifier selection device.

FIG. 1 is a block diagram illustrating the amplifier selection device 100. The amplifier selection device 100 includes a condition acquisition unit 11, a program acquisition unit 12, a program analysis unit 13, a data storage unit 14, a load calculation unit 15, a motor selection unit 16, an amplifier selection unit 17, an output calculation unit 18, and a common power supply selection unit 19.

The condition acquisition unit 11 acquires conditions necessary for motor selection, such as a driving mechanism of a machine driven by a motor, mechanical specifications of the driving mechanism, and motor acceleration and deceleration control settings. Examples of the driving mechanism of the machine include a ball screw mechanism, an index mechanism, and a pulley mechanism. The mechanical specifications are physical property values including the weight of the driving mechanism.

FIG. 2 illustrates a machine specification setting screen when a ball screw is selected as the driving mechanism. For example, mechanical efficiency, the weight of a moving object, a counter balance, the diameter of the ball screw, ball screw lead, the length of the ball screw, and a reduction ratio can be set as the mechanical conditions. The content of the settings is not limited thereto and differs depending on the driving mechanism.

Motor acceleration and deceleration control information is setting information such as a time constant. On the setting screen illustrated in FIG. 3, for example, an acceleration and deceleration type, an acceleration and deceleration time constant at the time of rapid traverse, an acceleration and deceleration time constant at the time of cutting feed, a position loop gain, a rapid traverse rate, and a positioning distance can be set as the acceleration and deceleration control information.

The program acquisition unit 12 acquires a machining program of the machine tool. The machining program may be read from the outside or may be input by the user. The program acquisition unit 12 may also receive, for example, changes in the acquired machining program and additions to the acquired machining program.

Figure 5:
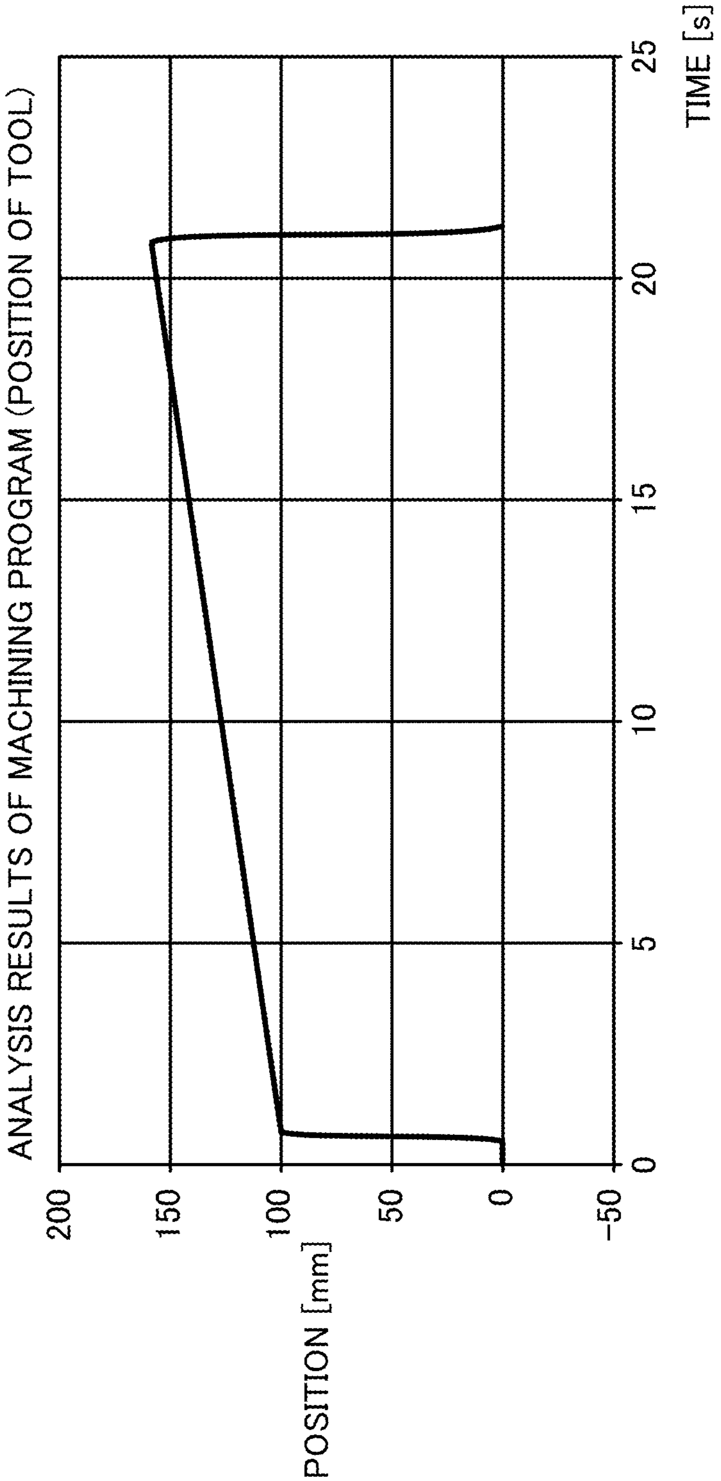
FIG. 5 is a graph illustrating a change in the position of a tool based on the machining program.
Figure 6:
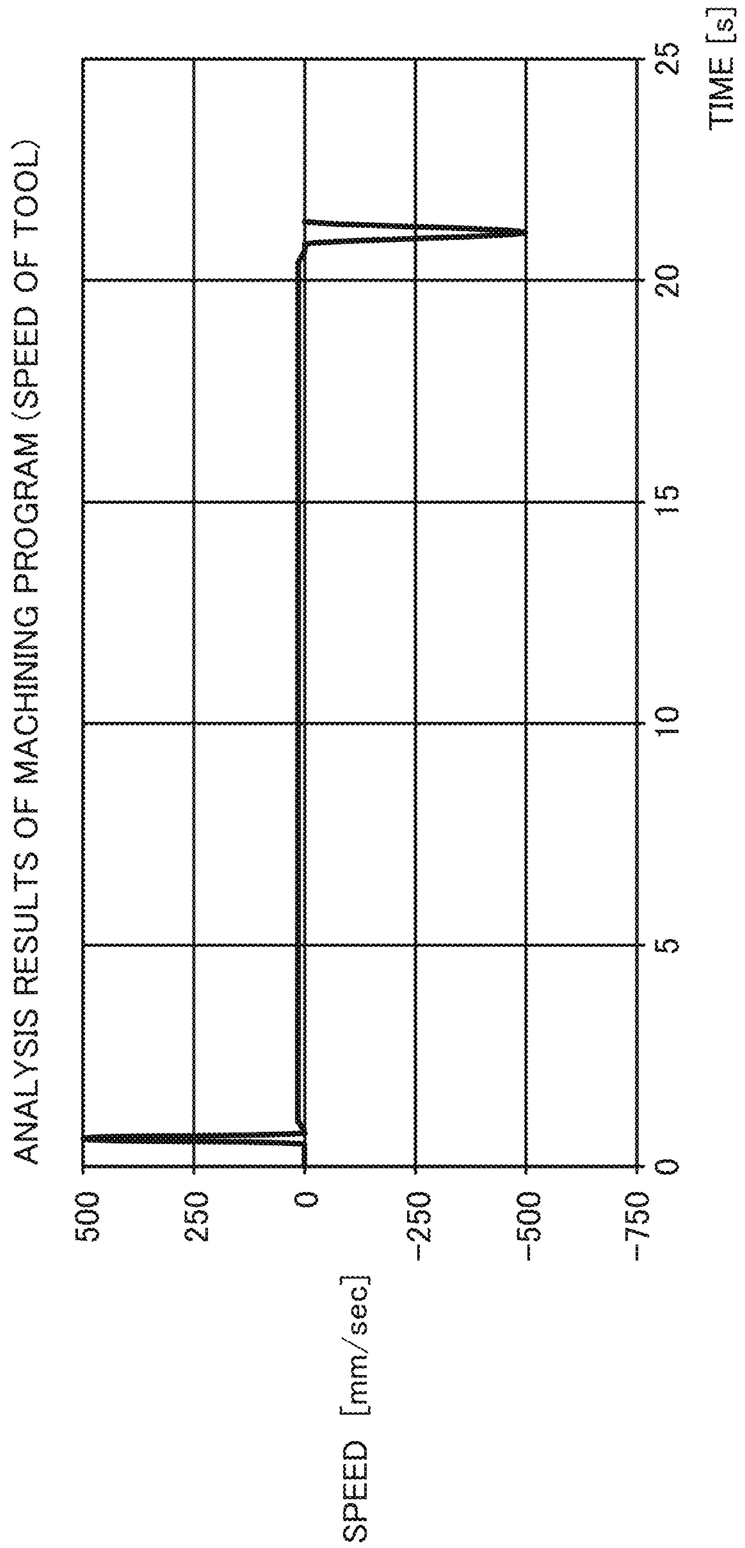
FIG. 6 is a graph illustrating a change in the speed of the tool based on the machining program.

The program analysis unit 13 analyzes the machining program and displays, for example, the position, speed, and load of each axis of the machine tool. As the analysis results of the machining program, a line number (line) of the machining program, a driving mechanism operation method (mode), time, a position, a speed, a cutting load, and a cutting time are displayed in a table illustrated in FIG. 4. A graph illustrated in FIG. 5 shows a change in the position of a tool of the machine tool based on the machining program, and a graph illustrated in FIG. 6 shows a change in the speed of the tool based on the machining program.

A machining program analysis method will be described with reference to a machining program illustrated in FIG. 7. A first line "G90G94" of the machining program illustrated in FIG. 7 is "coordinate system setting". Since this line has nothing to do with driving the motor, the analysis results are not reflected in the table or the graph.

A second line "G04X0.5" of the machining program is a command to "stop an X-axis motor for 0.5 seconds". The program analysis unit 13 analyzes this machining program and displays the analysis results of a mode "stop time", time "0.5 seconds", and a position "0" in the first line of the table in FIG. 4.

A third line "G00X100.F30000" of the machining program is a command to "move the X-axis by 100 mm at a speed of 30000 mm/min". The program analysis unit 13 displays a mode "rapid traverse", time "–", a position "100", and a speed "30000" in the second line of the table in FIG. 4. As described above, the program analysis unit 13 creates a table and a graph while analyzing the machining program.

The data storage unit 14 stores data necessary for selecting a motor, an amplifier, and a common power supply. Examples of the data stored in the data storage unit 14 include a rated output, rated torque, a rated rotation speed, the moment of inertia of a rotor, and a magnetic saturation coefficient. However, the data is not limited thereto.

The load calculation unit 15 calculates values related to the load of the motor on the basis of the driving mechanism of the machine, the specifications of the machine, the acceleration and deceleration information of the motor, and the analysis results of the machining program. In the present disclosure, the values related to the load of the motor are calculated on the basis of the machining program. Therefore, it is possible to obtain values close to actual control.

The values related to the load of the motor include, for example, moment of inertia, load torque, acceleration torque, deceleration torque, required torque, and root-mean-square torque (effective load torque).

(Expression 1) is an expression for calculating the required torque, and (Expression 2) is an expression for calculating the root-mean-square torque.

[Equation 1]

$$T = V_m \times \frac{2\pi}{60} \times \frac{1}{t_a} \times \left(J_M + \frac{J_L}{\eta}\right) + T_m + T_{cf} \quad \text{(Expression 1)}$$

T: Torque required for operation [Nm]

$V_m$: Amount of change in rotation speed of motor [$\text{min}^{-1}$]

$t_a$: Time constant of control [sec] (time of the speed change)

$J_M$: Moment of inertia of rotor [$\text{kgm}^2$]

$J_L$. Moment of inertia of load [$\text{kgm}^2$]

η: Mechanical efficiency $T_m$: Constant load torque [Nm]

$T_{cf}$: Cutting load torque [Nm]

[Equation 2]

$$T_{rms} = \sqrt{\frac{T_1^2 t_1 + T_2^2 t_2 + T_3^2 t_3 + \ldots + T_n^2 t_n}{t}} \quad \text{(Expression 2)}$$

$$t = t_1 + t_2 + t_3 + \ldots + t_n$$

$T_{rms}$: Root-mean-square torque [Nm]

$T_1$ to $T_n$: Required torque in each stage (for example, rapid traverse, cutting, and stop) during one cycle [Nm]

$t_1$ to $t_n$: Operation time in each stage during one cycle [s]

t: Total time of one cycle [s]

The motor selection unit 16 temporarily selects a motor that has a sufficient margin for the calculated required torque, that can be started and stopped at a desired pulse speed with respect to the moment of inertia applied to an output shaft of the motor, and that can ensure a desired acceleration time constant and a desired deceleration time constant with respect to the moment of inertia applied to the output shaft of the motor.

The motor selection unit 16 checks, for example, the effective torque value, acceleration and deceleration time constants, overload characteristics, and motor heating tolerance of the temporarily selected motor and selects a motor that satisfies the purpose of use of the machine tool.

The amplifier selection unit 17 acquires specification values of the maximum current and the continuous current of the motor from the data storage unit 14 and selects an amplifier that has a maximum current and a continuous current that exceeds the maximum current and the continuous current of the motor. In addition, the maximum current is the maximum current value that can flow in a short time when the maximum torque is generated, and the continuous current is the maximum current value that can flow continuously without overheating the motor. The maximum current and the continuous current are predetermined in the specifications of the motor.

A method of selecting an amplifier will be described with reference to FIG. 8. It is assumed that the machine tool has a plurality of motors and that an X-axis motor has already been selected among the plurality of motors. When the motor is selected, candidates for an amplifier are determined. In the example illustrated in FIG. 8, selection candidates “amplifier 1” and “amplifier 2” are determined.

For the selected X-axis motor, the specification value of the maximum current is “48 Ap”, and the specification value of the continuous current is “12 Ap”. The maximum current of “amplifier 1” is “40 Ap”, and the continuous current of “amplifier 1” is “11.5 Ap”. The maximum current of “amplifier 2” is “80 Ap”, and the continuous current of “amplifier 2” is “22.5 Ap”. The amplifier selection unit selects an amplifier that has a maximum current and a continuous current that exceeds the maximum current and the continuous current of the X-axis motor. In the example illustrated in FIG. 8, “amplifier 2” is selected.

Amplifiers are grouped for each common power supply. FIG. 9 is a list of amplifiers that belong to a common group. A group with an amplifier group name “AmpGroup1” includes motors with axis names “X”, “Y”, “Z”, and “spindle”. The model name of the selected amplifier is displayed in the table illustrated in FIG. 9.

The output calculation unit 18 calculates the output of the motor from a rotation speed and torque. The output calculation unit 18 calculates an output from the output of the motor and the loss of the motor. The output is an output that needs to be supplied from the power supply during the operation of the motor. Since the calculation of the output of the motor and the loss of the motor is the existing technique, the description thereof is omitted.

(Expression 3) is an expression for calculating the rotation speed. The output calculation unit 18 uses the analysis results of the machining program to calculate a time-series rotation speed. It is possible to calculate the time-series output of all of the motors connected to the common power supply on the machining program with reference to the data storage unit 14, the load calculation unit 15, and the analysis results of the machining program.

[Equation 3]

$$V_m = \frac{V}{P \times Z} \quad \text{(Expression 3)}$$

$V_m$: Rotation speed of motor [$min^{-1}$]

V: Work speed [m/min]

P: Pitch of feed screw [m/rev]

Z: Reduction ratio

The output is calculated in time series. FIG. 10 is a table in which the outputs are arranged in time series. In an example illustrated in FIG. 10, four outputs of the “X-axis”, “Y-axis”, “Z-axis”, and “spindle” motors are listed every minute. The output calculation unit 18 arranges the outputs of the four motors in time series when the machine tool is controlled according to the machining program.

The common power supply selection unit 19 calculates the total value of the output for each time calculated by the output calculation unit 18 and determines the maximum value of the total value. As can be seen from the example illustrated in FIG. 10, the total output of “1 min” is “14 kW”, the total output of “2 min” is “25 kW”, . . . , the total output of “30 min” is “7 kW”, and the maximum value of the total output is “25 kW” of “2 min”.

The common power supply selection unit 19 selects a common power supply with the minimum output among the common power supplies having a capacity exceeding the maximum value of the output on the basis of the calculated maximum value of the output and the specifications of the common power supplies.

A lower table in FIG. 10 shows the specification values of the common power supplies. The maximum outputs of two common power supplies of “common power supply 1” and “common power supply 2” are “27 kW” and “40 kW”, respectively. The maximum output “27 kW” of “common power supply 1” exceeds the maximum value “25 kW” of the total output. The common power supply selection unit 19 selects “common power supply 1” as the common power supply for the “X-axis”, “Y-axis”, “Z-axis”, and “spindle” motors.

For comparison, a common power supply selection method according to the related art will be described with reference to FIG. 11. In the selection of the common power supply according to the related art, the total value of the specification values of the maximum outputs is calculated, and a common power supply with an output exceeding the total value is selected. In an example illustrated in FIG. 11, the maximum output of the “X-axis” motor is “8 kW”, the maximum output of the “Y-axis” motor is “8 kW”, the maximum output of the “Z-axis” motor is “8 kW”, and the maximum output of the “spindle” motor is “6 kW”. The total of the specification values of the maximum outputs of the four motors is “30 kW”. In the selection of the common power supply according to the related art, "common power supply 2" that has a maximum output that exceeds the total "30 kW" of the specification values is selected.

In the selection method according to the related art, since the common power supply is selected on the basis of the maximum output of each motor, a common power supply with excessive capacity may be selected. According to the present disclosure, it is possible to prevent the selection of a common power supply with excessive capacity.

Figure 12:
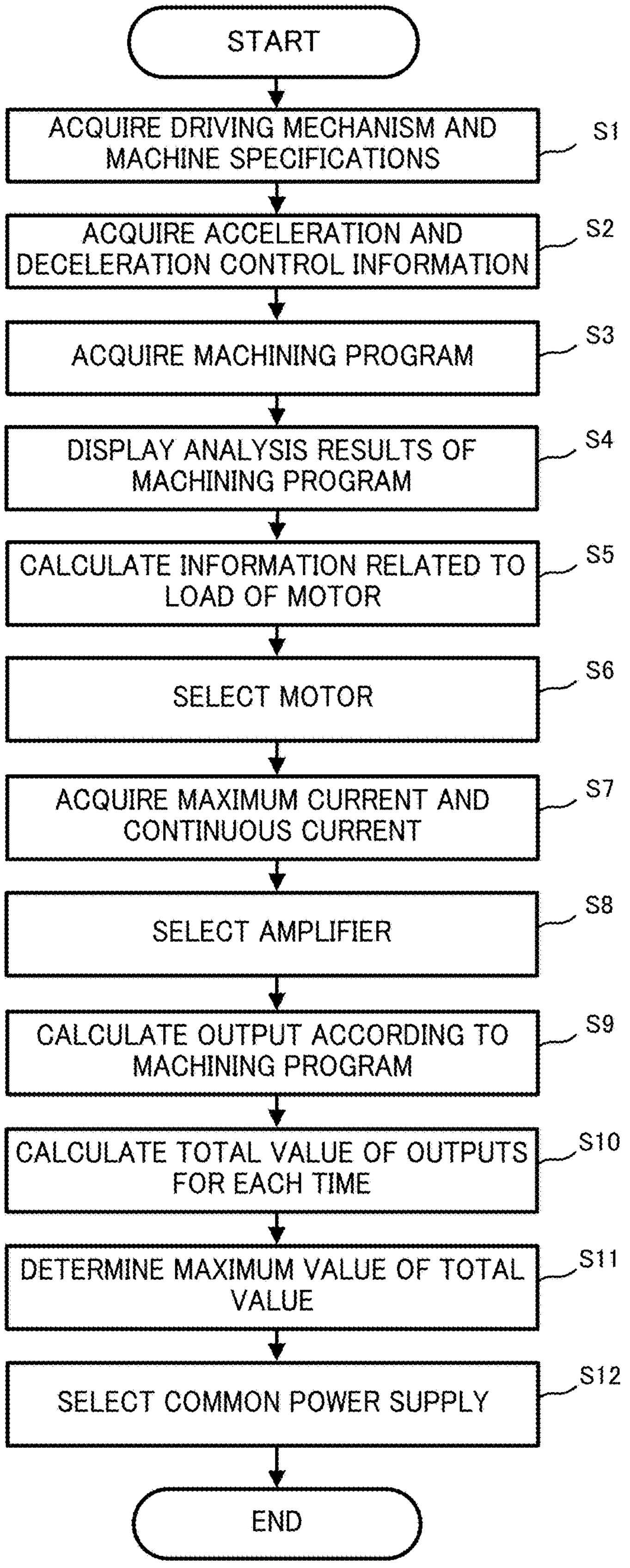
FIG. 12 is a flowchart illustrating an operation of the amplifier selection device.

FIG. 12 is a flowchart illustrating an operation of the amplifier selection device 100 according to the present disclosure.

The amplifier selection device 100 acquires a driving mechanism and machine specifications as information for selecting a motor (step S1), acquires acceleration and deceleration control information (step S2), and acquires a machining program (step S3).

The amplifier selection device 100 analyzes the machining program and arranges the analysis results in time series (step S4).

The amplifier selection device 100 calculates the values related to the load of the motor on the basis of the driving mechanism of the industrial machine, the machine specifications, the acceleration and deceleration information of the motor, and the analysis results of the machining program. The values related to the load of the motor include, for example, moment of inertia, load torque, acceleration torque or deceleration torque, required torque, and root-mean-square torque (step S5).

The amplifier selection device 100 selects a motor on the basis of the values related to the load of the motor (step S6). Since a method for selecting the motor is the existing technology, the description thereof is omitted.

The amplifier selection device 100 acquires the specification values of the maximum current and the continuous current on the basis of the selected motor (step S7). The amplifier selection device 100 selects an amplifier on the basis of the acquired specification values of the maximum current and the continuous current of the motor (step S8).

The amplifier selection device 100 calculates the output of each of the motors, which are supplied with power from the common power supply, in time series according to the analysis results of the machining program (step S9). The amplifier selection device 100 calculates the total value of the outputs of the motors for each time (step S10).

The amplifier selection device 100 determines the maximum value of the total value of the outputs of the motors (step S11). The amplifier selection device 100 selects a common power supply having the maximum output greater than the maximum value calculated in step S11 (step S12).

[Second Disclosure]

Next, an amplifier selection device 100 according to a second disclosure will be described.

The amplifier selection device 100 according to the second disclosure has the same configuration as the amplifier selection device 100 according to the first disclosure. The amplifier selection device 100 according to the second disclosure differs from the amplifier selection device 100 according to the first disclosure in an amplifier selection method in the amplifier selection unit 17.

The amplifier selection unit 17 according to the second disclosure calculates the maximum current and a root-mean-square current and selects an amplifier using the calculated required current and root-mean-square current. The maximum current is the maximum current required. The maximum current is calculated from the required torque. (Expression 4) is an expression for calculating the required current and the root-mean-square current. In a synchronous motor, up to a certain amount of current, torque and current are in a proportional relationship with a torque constant as a coefficient. However, in a case in which the amount of current is further increased, a phenomenon called magnetic saturation occurs, and the torque generated per current is reduced due to the magnetic saturation. Therefore, the required current is calculated in consideration of the magnetic saturation. A magnetic saturation coefficient differs depending on a torque range even for the same motor. The magnetic saturation coefficient is stored in the data storage unit 14 in advance. An amplifier is selected using the calculated required current and root-mean-square current, which makes it possible to make efficient settings matched with the actual torque.

[Equation 4]

$$I = \frac{T}{K_t \times (1 - f)} \quad \text{(Expression 4)}$$

I: Required current [Arm]
T: Required torque [Nm]
$K_t$: Torque constant [Nm/Arms]
f: Magnetic saturation coefficient FIG. 13 illustrates an example of the maximum current and the root-mean-square current calculated according to the machining program. The amplifier selection unit 17 calculates the required current from the required torque and calculates the root-mean-square current from the root-mean-square torque. The calculated maximum current of the X-axis motor is "40 Ap", and the root-mean-square current of the X-axis motor is "9 Ap". The amplifier selection unit 17 selects "amplifier 1" that has a maximum output that exceeds the calculated maximum current of "40 Ap" and the calculated root-mean-square current of "9 Ap".

In the selection of the amplifier according to the first disclosure, the maximum current and the continuous current determined by the specifications of the X-axis motor are used. In many cases, the maximum current and the continuous current determined by the specifications are configured to have margins, which may lead to the selection of an amplifier with excessive capacity.

The amplifier selection device 100 according to the second disclosure selects an amplifier not on the basis of the maximum current and the continuous current of the specification values, but on the basis of the maximum current and the root-mean-square current calculated according to the machining program. Therefore, it is possible to prevent the selection of an amplifier with excessive capacity.

[Third Disclosure]

Next, an amplifier selection device 100 according to a third disclosure will be described.

The amplifier selection device 100 according to the third disclosure selects a linear motor. Since the configuration of the amplifier selection device 100 according to the third disclosure is the same as that of the amplifier selection device 100 according to the first disclosure, the description thereof will be omitted.

In the amplifier selection device 100 according to the third disclosure, the calculation expressions of the load calculation unit 15 and the output calculation unit 18 are different. For the linear motor, a required thrust is calculated instead of the required torque, and a root-mean-square thrust is calculated instead of the root-mean-square torque. The required current is calculated from the required thrust, and the root-mean-square current is calculated from the root-mean-square thrust. (Expression 5) is an expression for calculating the required thrust, (Expression 6) is an expression for calculating the root-mean-square thrust, and (Expression 7) is an expression for calculating the required current and the root-mean-square current.

[Equation 5]

$$F = M \times V \times \frac{1}{t_a} + F_m + F_{cd} \qquad \text{(Expression 5)}$$

F: Thrust required for operation [N]
M: Weight of moving object [kg]
V: Amount of change in speed of motor [n/s]
$t_a$: Time constant of control [sec]
$F_m$: Constant load force [N]
$F_{cf}$: Cutting load force [N]

[Equation 6]

$$F_{rms} = \sqrt{\frac{F_1^2 t_1 + F_2^2 t_2 + F_3^2 t_3 + \ldots + F_n^2 t_n}{t}} \qquad \text{(Expression 6)}$$

$$t = t_1 + t_2 + t_3 + \ldots + t_n$$

$F_{rms}$: Root-mean-square thrust [N]
$F_1$ to $F_n$: Required thrust in each stage (for example, rapid traverse, cutting, and stop) during one cycle [N]
$t_1$ to $t_n$: Operation time in each stage during one cycle [s]
t: Total time of one cycle [s]

[Equation 7]

$$1 = \frac{F}{K_t \times (1 - f)} \qquad \text{(Expression 7)}$$

I: Required current [Arm]
$K_t$: Thrust constant [N/Arms]
f: Magnetic saturation coefficient The output calculation unit 18 calculates the output of the linear motor from a speed and a thrust. An output is calculated from the output of the linear motor and the loss of the linear motor. The output is an output that needs to be supplied from the power supply during the operation of the linear motor. Since the calculation of the output of the linear motor and the loss of the linear motor is the existing technique, the description thereof is omitted. The output calculation unit 18 acquires a speed using the analysis results of the machining program. The speed is output using the data storage unit 14, the load calculation unit 15, and the analysis results of the machining program. It is possible to calculate the output necessary for the actual operation of all of the linear motors connected to the common power supply in time series, with reference to the data storage unit 14, the load calculation unit 15, and the analysis results of the machining program.

The common power supply selection unit 19 calculates the total value of the outputs for each time calculated by the output calculation unit 18 and determines the maximum value of the total value. The common power supply selection unit 19 selects a common power supply having a capacity exceeding the calculated maximum value of the output.

As described above, the amplifier selection device 100 according to the present disclosure can also be applied to select a linear motor.

[Hardware Configuration]

Figure 14:
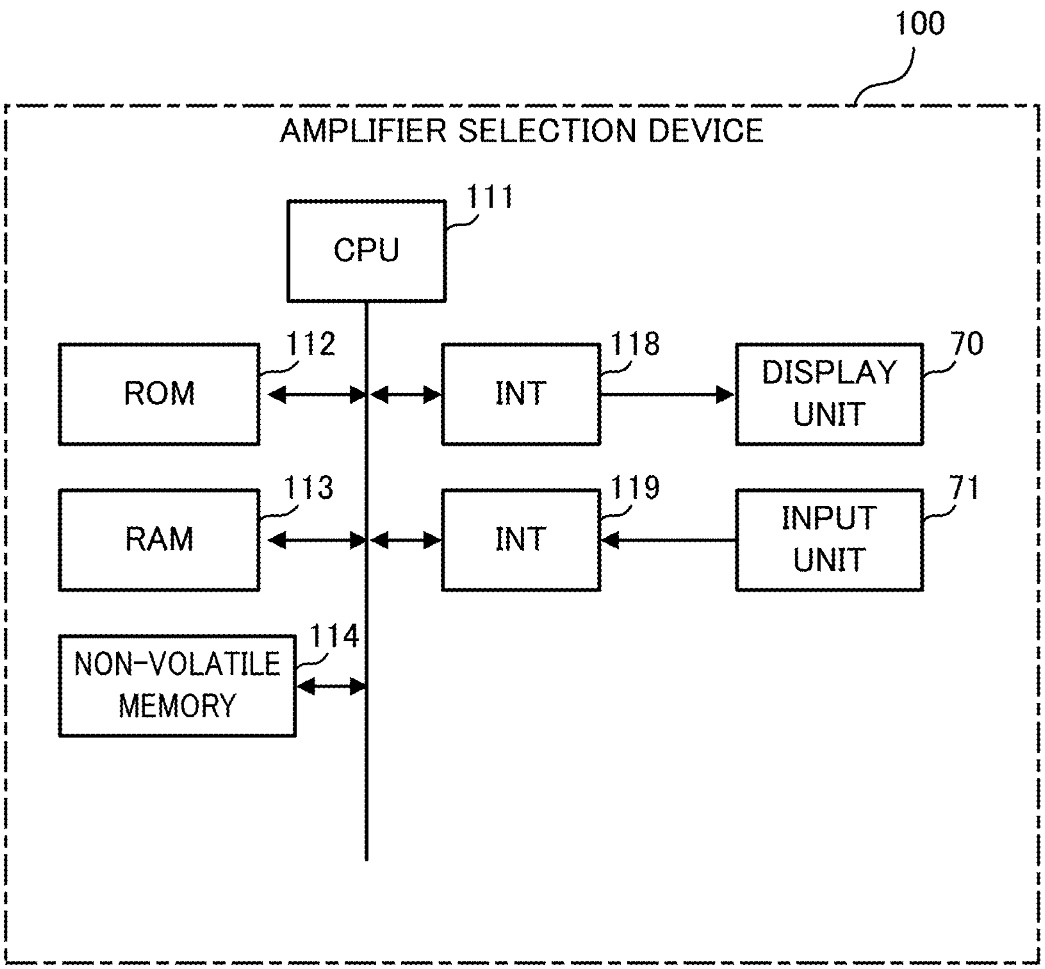
FIG. 14 is a diagram illustrating a hardware configuration of the amplifier selection device according to the present disclosure.

The amplifier selection device 100 according to the first to third disclosures has a hardware configuration illustrated in FIG. 14.

The hardware configuration of the amplifier selection device 100 will be described with reference to FIG. 14. A CPU 111 included in the amplifier selection device 100 is a processor that controls the overall operation of the amplifier selection device 100. The CPU 111 reads the system program processed in a ROM 112 through a bus and controls the entire amplifier selection device 100 according to the system program. A RAM 113 temporarily stores, for example, temporary calculation data or display data and various types of data input by the user through an input unit 71.

A display unit 70 is, for example, a monitor attached to the amplifier selection device 100. The display unit 70 displays, for example, an amplifier selection software operation screen.

The input unit 71 is, for example, a keyboard or a touch panel that is integrated with the display unit 70 or that is separated from the display unit 70. The user operates the input unit 71 to select an amplifier and a common power supply.

A non-volatile memory 114 is, for example, a memory that is backed up by a battery (not illustrated) such that a storage state is retained even when the amplifier selection device 100 is turned off. The non-volatile memory 114 stores programs read from an external apparatus through an interface (not illustrated), programs input through the input unit 71, and various types of data (for example, setting parameters acquired from the machine tool) acquired from each unit of the amplifier selection device 100, the machine tool, and the like. The programs and various types of data stored in the non-volatile memory 114 may be developed in the RAM 113 at the time of execution/use. In addition, various system programs are written in the ROM 112 in advance.

In the amplifier selection device 100 according to the present disclosure, it is possible to select a motor, using the values close to the actual control, on the basis of the machining program.

Further, in the amplifier selection device 100 according to the present disclosure, the output of each motor is calculated in time series on the basis of the machining program. The output of the motor changes over time. The outputs of a plurality of motors that change over time are added up, which makes it possible to acquire the total output that is close to the actual control and to make efficient settings matched with the actual torque.

EXPLANATIONS OF LETTERS OR NUMERALS

100 AMPLIFIER SELECTION DEVICE
11 CONDITION ACQUISITION UNIT
12 PROGRAM ACQUISITION UNIT
13 PROGRAM ANALYSIS UNIT
14 DATA STORAGE UNIT
15 LOAD CALCULATION UNIT
16 MOTOR SELECTION UNIT
17 AMPLIFIER SELECTION UNIT
18 OUTPUT CALCULATION UNIT
19 COMMON POWER SUPPLY SELECTION UNIT
111 CPU
112 ROM
113 RAM
114 NON-VOLATILE MEMORY

The invention claimed is:

1. An amplifier selection device for industrial machine, the amplifier selection device comprising:

a processor configured to acquire a program of the industrial machine, analyze the program, select a motor of the industrial machine, select an amplifier suitable for the motor of the industrial machine, calculate an output of the motor for each time when the motor is controlled according to a command of the program, determine a maximum value of the output of the motor for each time, and select a common power supply for supplying power to the amplifier based on the maximum value, wherein the processor is further configured to calculate a required torque or a required thrust according to the program, calculate a required current based on the required torque or the required thrust, and select the amplifier based on the required current.

2. The amplifier selection device according to claim 1, wherein the industrial machine has a plurality of motors, and the processor is further configured to calculate a total value of outputs of the plurality of motors for each time, determine a maximum value of the total value for each time, and select the common power supply based on the maximum value of the total value.

3. The amplifier selection device according to claim 1, wherein the processor is further configured to calculate a root-mean-square torque or a root-mean-square thrust according to the program, calculate a root-mean-square current based on the root-mean-square torque or the root-mean-square thrust, and select the amplifier based on the root-mean-square current.

4. The amplifier selection device according to claim 1, wherein the processor is further configured to have at least one of a function of inputting the program and a function of changing the program.

5. A non-transitory storage medium storing computer-readable commands causing one or more processors to:

acquire a program of an industrial machine;

analyze the program;

select a motor of the industrial machine;

select an amplifier suitable for the motor of the industrial machine;

calculate an output of the motor for each time when the motor is controlled according to a command of the program;

determine a maximum value of the output of the motor for each time; and select a common power supply for supplying power to the amplifier based on the maximum value, wherein the computer-readable commands further cause the one or more processors to calculate a required torque or a required thrust according to the program, calculate a required current based on the required torque or the required thrust, and select the amplifier based on the required current.

6. An amplifier selection device for an industrial machine, the amplifier selection device comprising:

a processor configured to acquire a program of the industrial machine, analyze the program, select a motor of the industrial machine, select an amplifier suitable for the motor of the industrial machine, calculate an output of the motor for each time when the motor is controlled according to a command of the program, determine a maximum value of the output of the motor for each time, and select a common power supply for supplying power to the amplifier based on the maximum value, wherein the processor is further configured to calculate a root-mean-square torque or a root-mean-square thrust according to the program, calculate a root-mean-square current based on the root-mean-square torque or the root-mean-square thrust, and select the amplifier based on the root-mean-square current.

* * * * *